United States Patent [19]

Liu

[11] Patent Number: 5,590,916
[45] Date of Patent: Jan. 7, 1997

[54] RENEWABLE WEAR-PROOF ELBOW WITH A DETACHABLE BUFFER CHAMBER

[76] Inventor: Chin-Fu Liu, 5 Fl., No. 7, Lane 20, Kang-Le St., Nei Hu District, Taipei, Taiwan

[21] Appl. No.: 492,163

[22] Filed: Jun. 19, 1995

[51] Int. Cl.[6] .................................................. F16L 43/00
[52] U.S. Cl. ........................ 285/127; 285/179; 406/193; 406/195
[58] Field of Search ............................ 285/16, 179, 127; 406/193, 195

[56] References Cited

U.S. PATENT DOCUMENTS

| | | | |
|---|---|---|---|
| 898,882 | 9/1908 | Hawkins | 285/16 |
| 1,258,893 | 3/1918 | Griffin | 285/16 |
| 4,387,914 | 6/1983 | Paulson et al. | 285/179 X |
| 4,595,319 | 6/1986 | Cook | 285/179 X |
| 4,606,556 | 8/1986 | Metzger | 286/16 |
| 5,060,984 | 10/1991 | Hess | 285/179 X |

*Primary Examiner*—Dave W. Arola
*Attorney, Agent, or Firm*—W. Wayne Liauh

[57] ABSTRACT

A renewable wear-proof elbow is disclosed which can be connected to a pipe and become a part thereof for transporting particles of powdered material via compressed air. The renewable wear-proof elbow comprises a main elbow portion and a buffer chamber. The main elbow portion comprises: (a) an inlet at one end of the main elbow portion having a first flange for connection with a first section of the pipe; (b) an outlet at another end of the main elbow portion having a second flange for connection with a second section of the pipe; (c) a first side opening formed on a side wall of the main elbow portion opposite the inlet; and (d) a third flange formed around the first side opening. The buffer chamber has a second side opening, a central axis, and a fourth flange, which is formed around the second opening and is engageable with the third flange so as to allow the buffer chamber to be removably affixed to the main elbow portion at the first side opening thereof. The main elbow portion further comprises a bent pipe wall section near the first side opening thereof so as to allow the buffer chamber to be affixed to the main elbow portion in a manner such that the central axis of the buffer chamber is offset with respect to the central axis of the inlet.

5 Claims, 8 Drawing Sheets

RENEWABLE WEAR-PROOF ELBOW WITH A DETACHABLE BUFFER CHAMBER

BACKGROUND OF THE INVENTION

When particles of powdered material are transferred through a pipeline by means of compressed air flow, their travel direction can be changed by mounting an elbow A in the pipeline as shown in FIG. 1. Particles moving from a straight pipe into the elbow A will immediately impact upon a turning portion of elbow A and bound therefrom to change their travel direction. Such constant and immediate impact of the particles upon the wall of the elbow causes the elbow to wear out quickly and even break. Moreover, fierce turbulence in the air flow is caused by these bounded particles in the elbow to reduce the flow speed of particles and may dangerously clog the pipeline. To solve such problems, it is usually effective to increase the air pressure inside the pipeline and to introduce secondary compressed air into the elbow from a front end thereof, so as to speed up the flow of the particles. However, these actions only speed up the wearing down of the elbow.

To overcome the wearing problem existing in ordinary elbows, an elbow B, having a larger radius of curvature, as shown in FIG. 2, is developed. It is expected that the larger radius of curvature of the elbow B will expand an area on which the particles impact and thereby, the unit pressure thereof is reduced. However, in a practical application of the elbow B, it indicates that a longer travel distance provided by the elbow B will only lengthen the area where a turbulence would occur. In the case where a low melting point material is transported, filaments adversely occur due to heat generated by a material with an excess amount of friction with the wall of the elbow B.

Another solution adopted is to use a tee C. As shown in FIG. 3, one of the three ends of the tee C is sealed so that a fight angular path is formed in the tee C. Particles or powdered material are deposited and accumulated at the sealed end of the tee C function to some extent to avoid the wearing down of the tee at that portion. However, a portion of the wall of the tee C, near an outlet thereof, angularly opposite to the sealed fight angular portion, is inevitably worn out due to constant abrasion by those particles rebounded from the sealed right angular portion. And, a clogged pipeline may still be the result.

To enhance the wearability of the elbow or tee for such purpose, there are ceramic-lined elbows in the market with the expectation that the hardness of the ceramic material may overcome the problem of rapid wearing of the elbow. However, such ceramic-lined elbows require an extremely high manufacturing cost while it prolongs only limited times of usable life of the elbow compared to conventional elbows. That is, the ceramic elbow is not economical when viewing from this standpoint. Moreover, particles of broken ceramic materials mixed with transferred materials can cause a considerably big problem to the quality of the transferred materials.

SUMMARY OF THE INVENTION

It is therefore a primary object of the present invention to provide a renewable wear-proof elbow in which a wear-proof and pressurized buffer chamber is detachably attached to an outer corner of the elbow. The buffer chamber can be replaced with a new one when it is damaged due to frequent use without the necessity of discarding the whole elbow. With this buffer chamber, the disadvantages exist in the conventional and commercially available elbow, such as the easy wearing out, breaking, or damaged coating of the elbow due to its constant frictional contact with the transferred particles, and the highly consumed power and noise possibly caused by a damaged elbow, may be effectively improved.

That is, the elbow of the present invention is characterized by the wear-proof, pressurized buffer chamber detachably attached to the elbow at a position opposite to the inlet end thereof. The arrangement of this buffer chamber allows a small part of transferred particles to enter and move along the curved wall of the chamber and return to the elbow again, and then keep moving towards the outlet end of the elbow. Most parts of the other transferred particles orient themselves to the outlet end of the elbow due to a pressure difference between the chamber and the elbow.

An elbow with a buffer chamber, according to the present invention, is further characterized by an average usable life twice as long as that of a ceramic-lined elbow.

DETAILED DESCRIPTION OF THE PREFERRED EMBODIMENT

Figure 1:
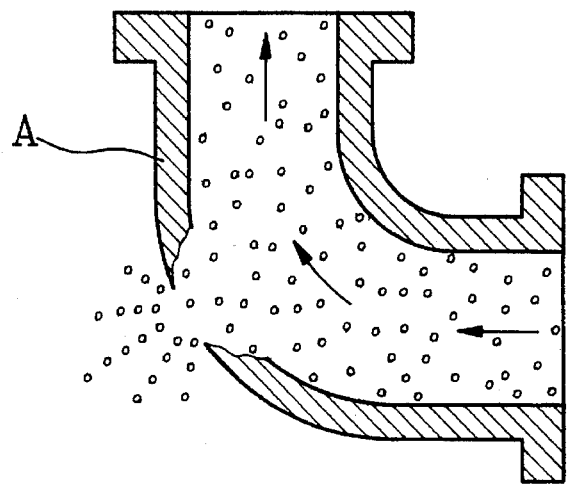
FIG. 1 is a schematic, sectional, plan view showing a conventional elbow in a using state and an outer corner thereof having been broken due to wearing.
Figure 2:
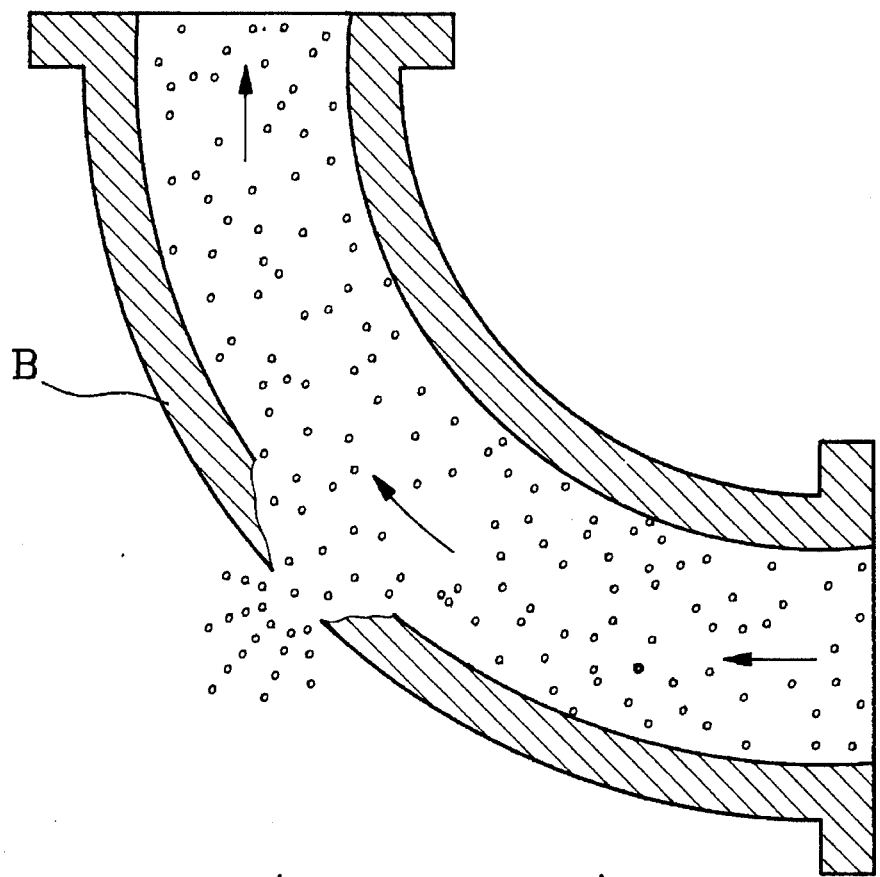
FIG. 2 is another schematic, sectional, plan view showing another conventional elbow having a large radius of curvature, wherein an outer corner of the elbow is broken due to wearing.
Figure 3:
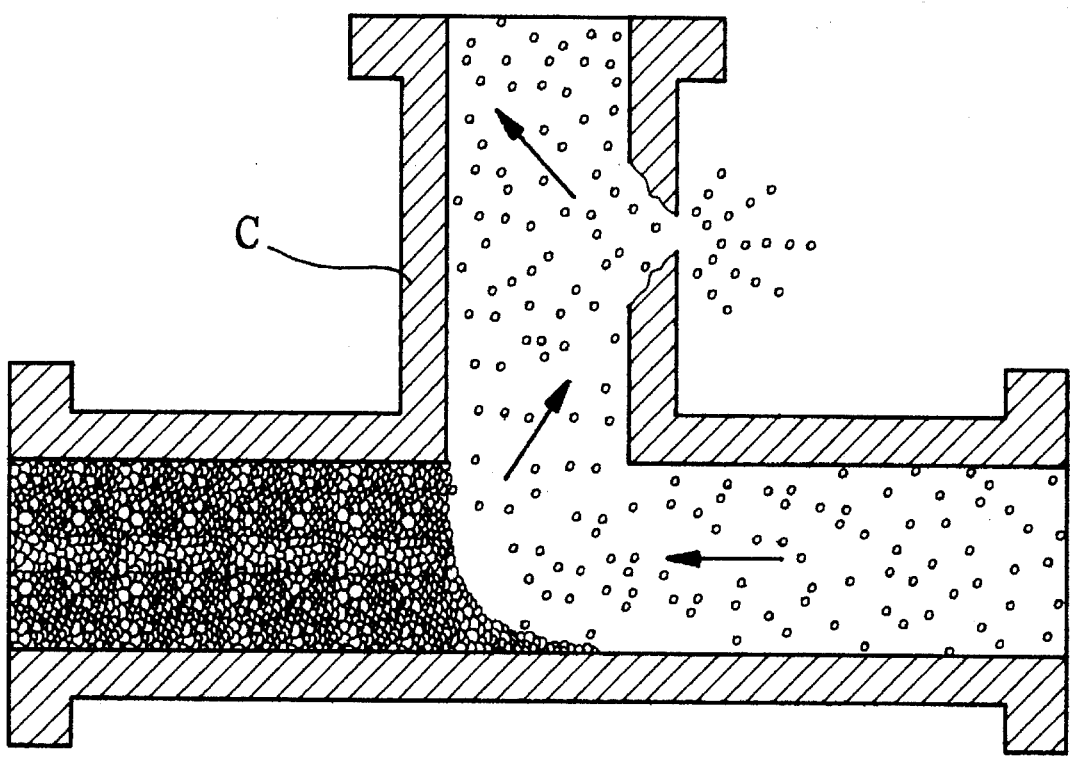
FIG. 3 is still another schematic, sectional, plan view showing a conventional tee being employed to replace a conventional elbow, wherein one end of the tee is sealed and a portion of the tee near an outlet end thereof is broken due to wearing off.
Figure 4:
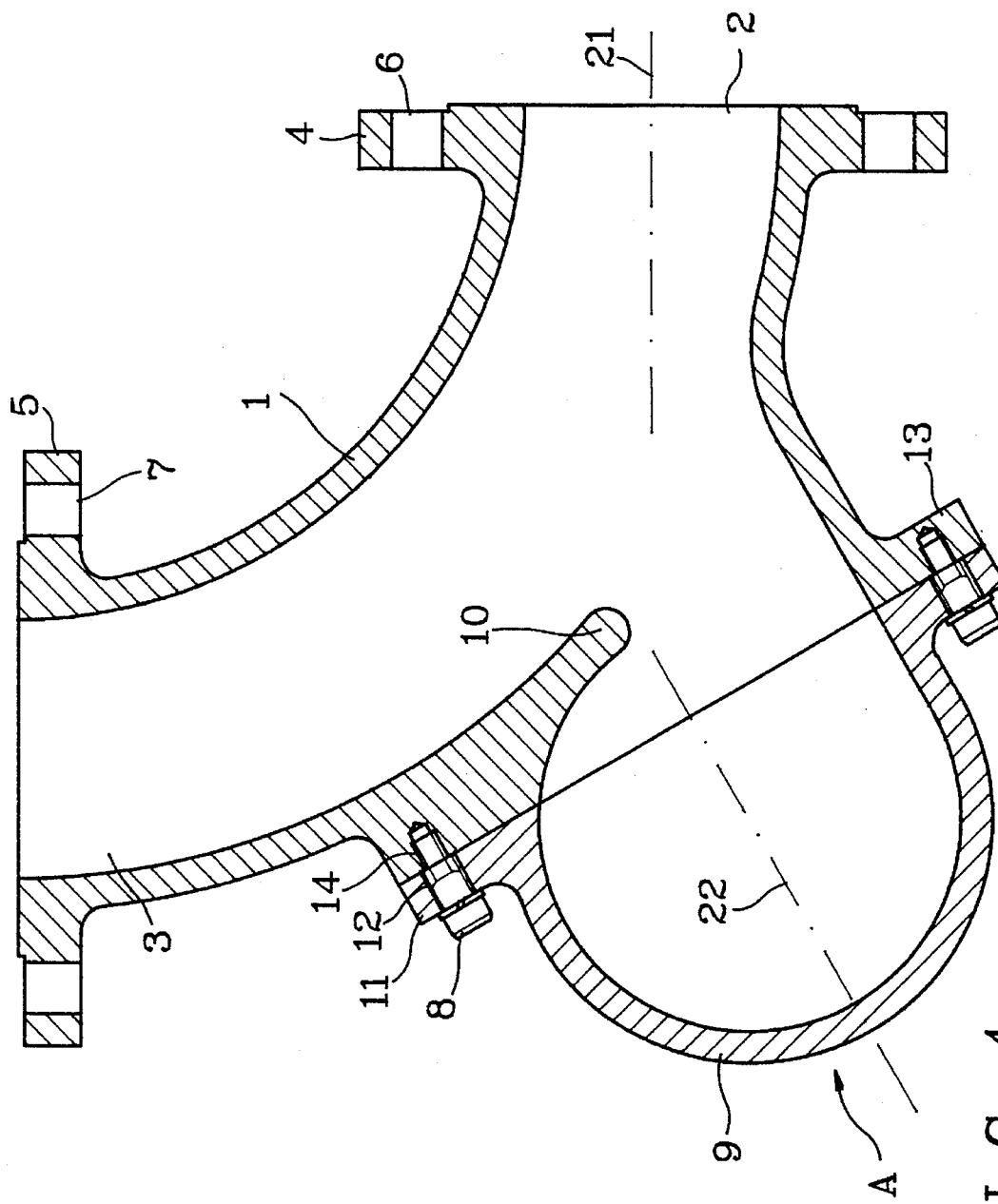
FIG. 4 is a sectional plan view of an elbow according to the present invention.
Figure 5:
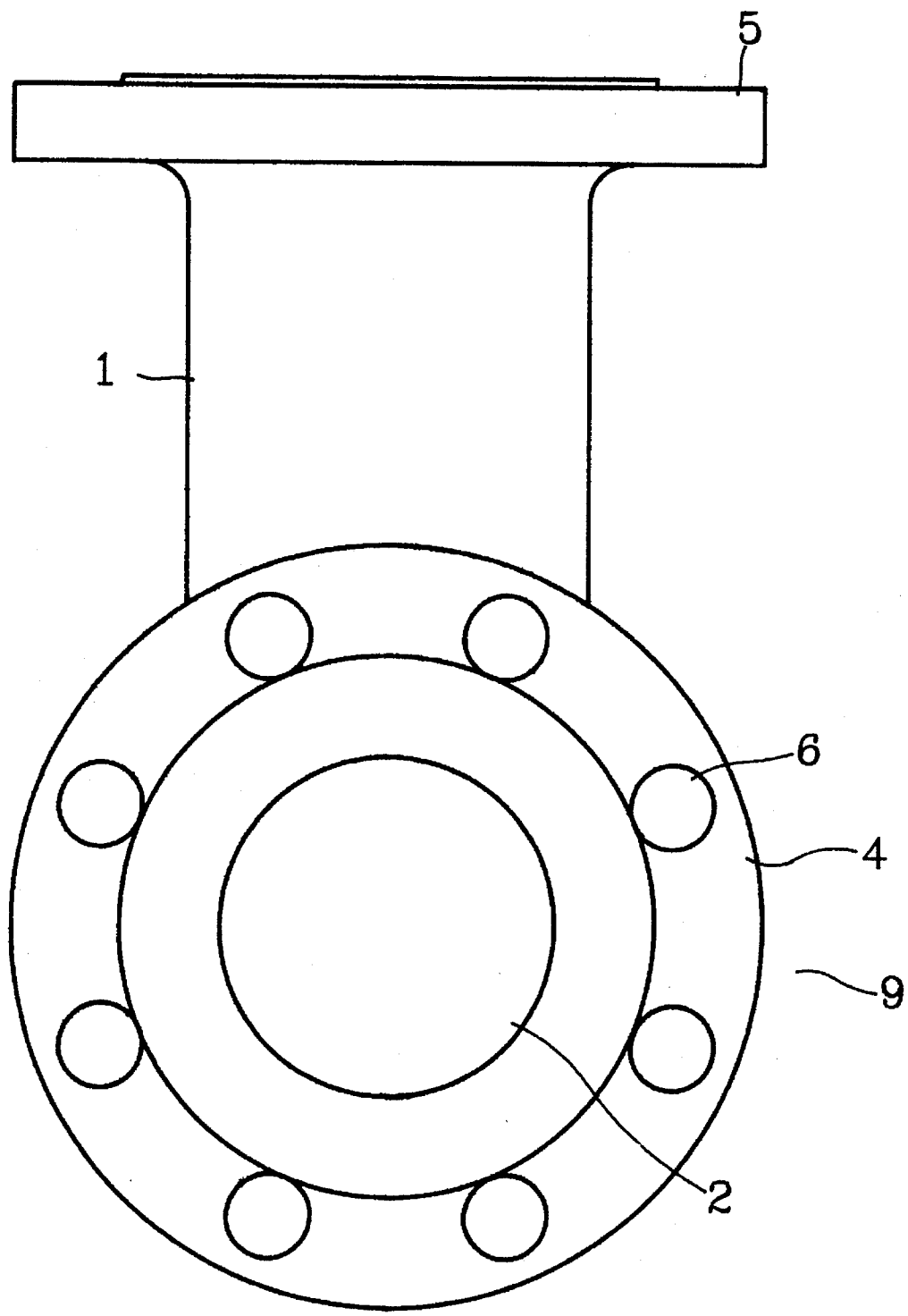
FIG. 5 is a side view of the elbow of the present invention.
Figure 7:
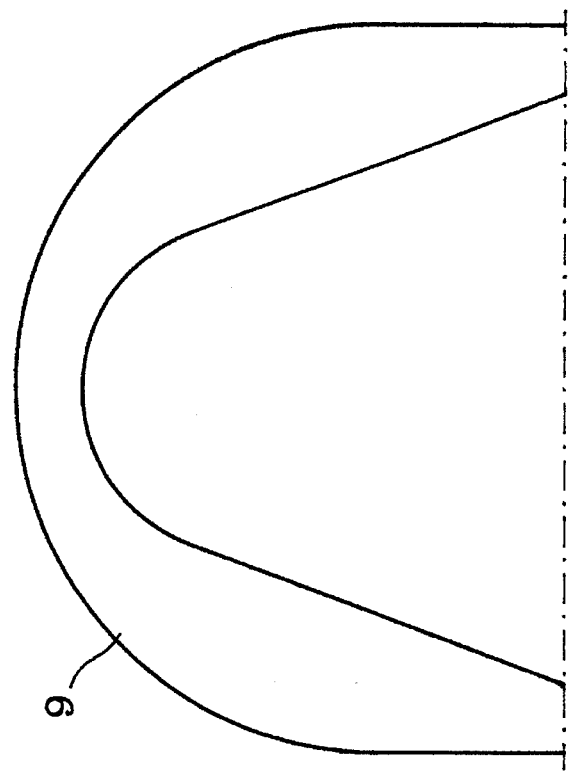
FIG. 7 is a cross sectional view of the attached buffer chamber of the present invention viewing at an angle of 45 degrees.
Figure 6:
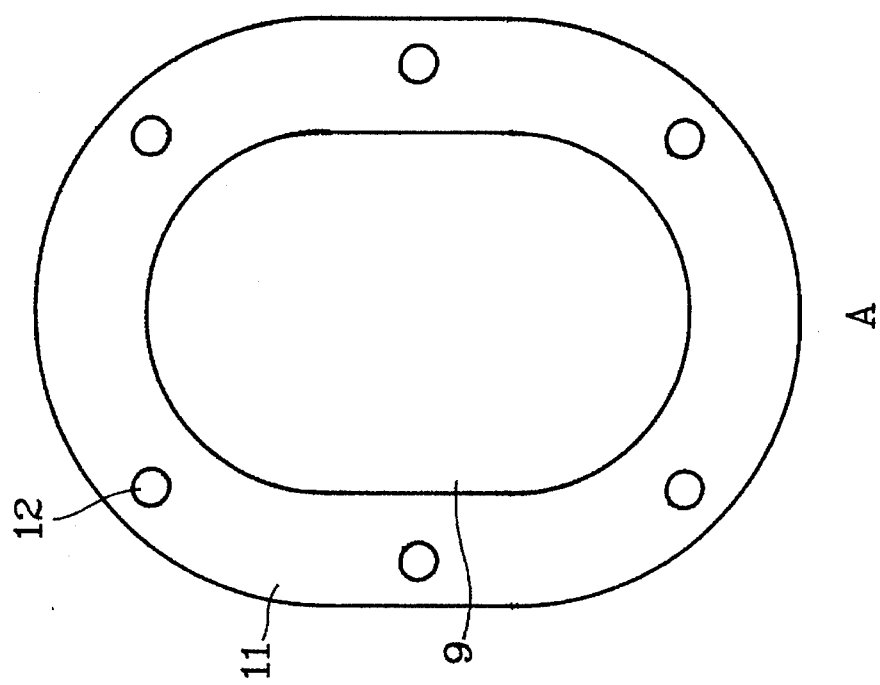
FIG. 6 is a partial side view of FIG. 4 when viewing in the direction of arrow A.
Figure 8:
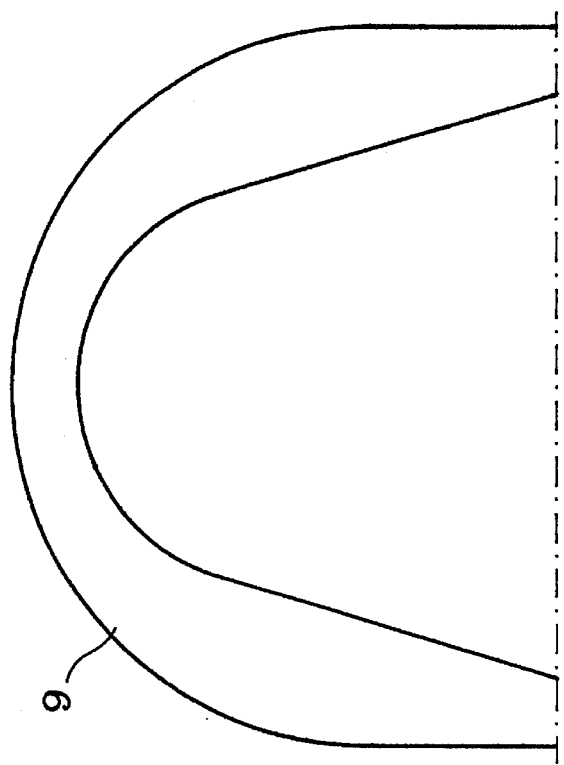
FIG. 8 is a cross sectional view of the attached buffer chamber of the present invention viewing at an angle of 108.75 degrees.
Figure 9:
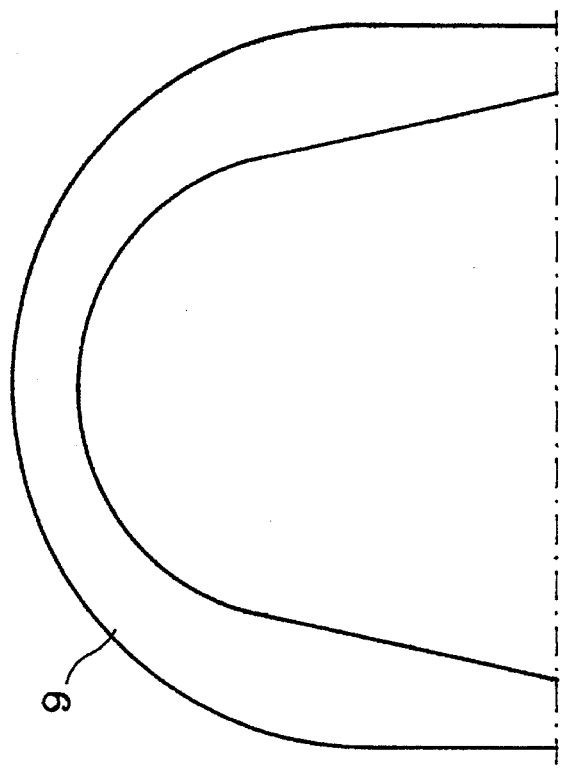
FIG. 9 is a cross sectional view of the attached buffer chamber of the present invention viewing at an angle of 172.50 degrees.
Figure 11:
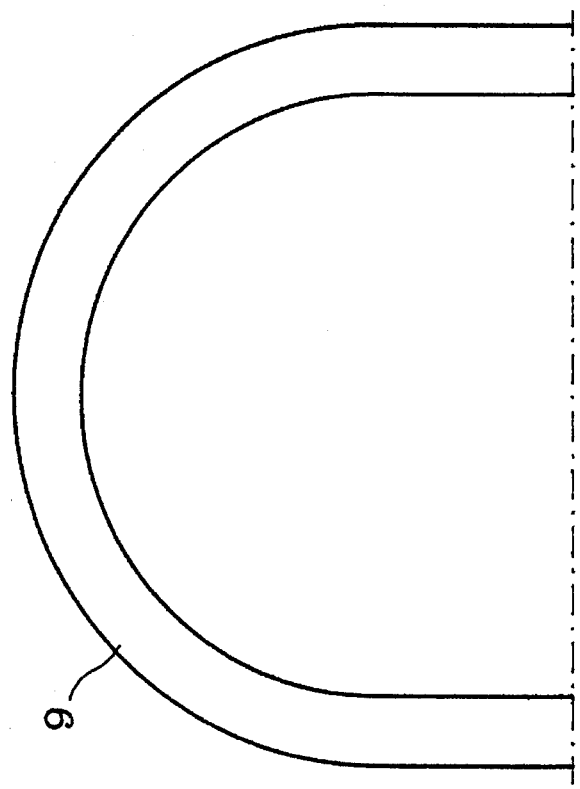
FIG. 11 is a cross sectional view of the attached buffer chamber of the present invention viewing at an angle of 300 degrees.
Figure 10:
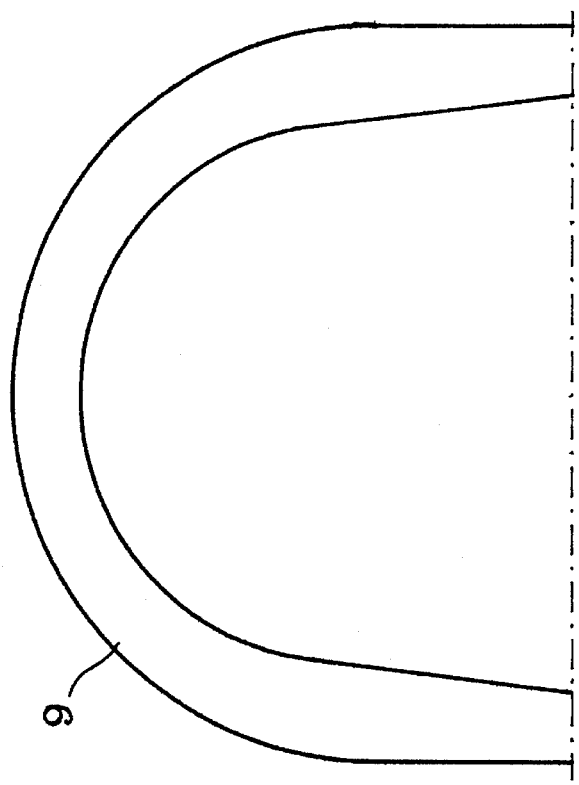
FIG. 10 is a cross sectional view of the attached buffer chamber of the present invention viewing at an angle of 236.25 degrees.

Please refer to FIGS. 4 and 5 in which a sectional plan view and a side view of renewable wear-proof elbow 1, according to the present invention, are respectively shown. Elbow 1 has inlet end 2 and outlet end 3. First flange 4 and second flange 5 are respectively provided around an outer rim of inlet end 2 and outlet end 3. A plurality of through holes 6 and 7 are respectively formed on first and second flanges 4 and 5 for screws to thread through for the purpose of coupling. Elbow 1 is further provided at a portion thereof substantially opposite to inlet end 2 with a first side opening which is provided around an outer rim thereof third flange 13. A plurality of threaded holes 14 are formed around third flange 13 at predetermined intervals. Chamber 9, having a second side opening, is detachably attached to elbow 1, such that the second side opening and fourth flange 11 integrally formed around an outer rim thereof are fitly in alignment with the first side opening of elbow 1 and third flange 13 thereof, respectively. A plurality of through holes 12 are provided on fourth flange 11 at intervals corresponding to threaded holes 14 formed on third flange 13 for screws 8 to thread therethrough, permitting chamber 9 to be firmly but detachably screwed to elbow 1 with its second side opening substantially facing inlet end 2 of elbow 1.

Buffer chamber 9 has an inner space approximate to a half rounded-head cone and therefore has cross sectional areas gradually increasing from top to bottom.

The elbow 1 further comprises a bent pipe wall section 23 near the first side opening so as to allow the buffer chamber 9 to be affixed to the elbow 1 in a manner such that the central axis of the buffer chamber 22 is offset with respect to the central axis of the inlet 21.

FIGS. 7 through 11 respectively illustrate cross sectional views of chamber 9 when viewing at different angles of 45, 108.75, 172.50, 236.25, and 300 degrees.

What is to be noted is that a part of elbow 1 on a joint of third flange 14 with fourth flange 11 near outlet end 3 of elbow 1 inwardly extends and projects towards inlet end 2 to form tongue portion 10. Tongue portion 10 extends preferably to a point, which when viewing sidewardly as shown in FIG. 4, is distant from an upper rim of inlet end 2 from about ¼ to about ⅜ of a diameter thereof.

Figure 12:
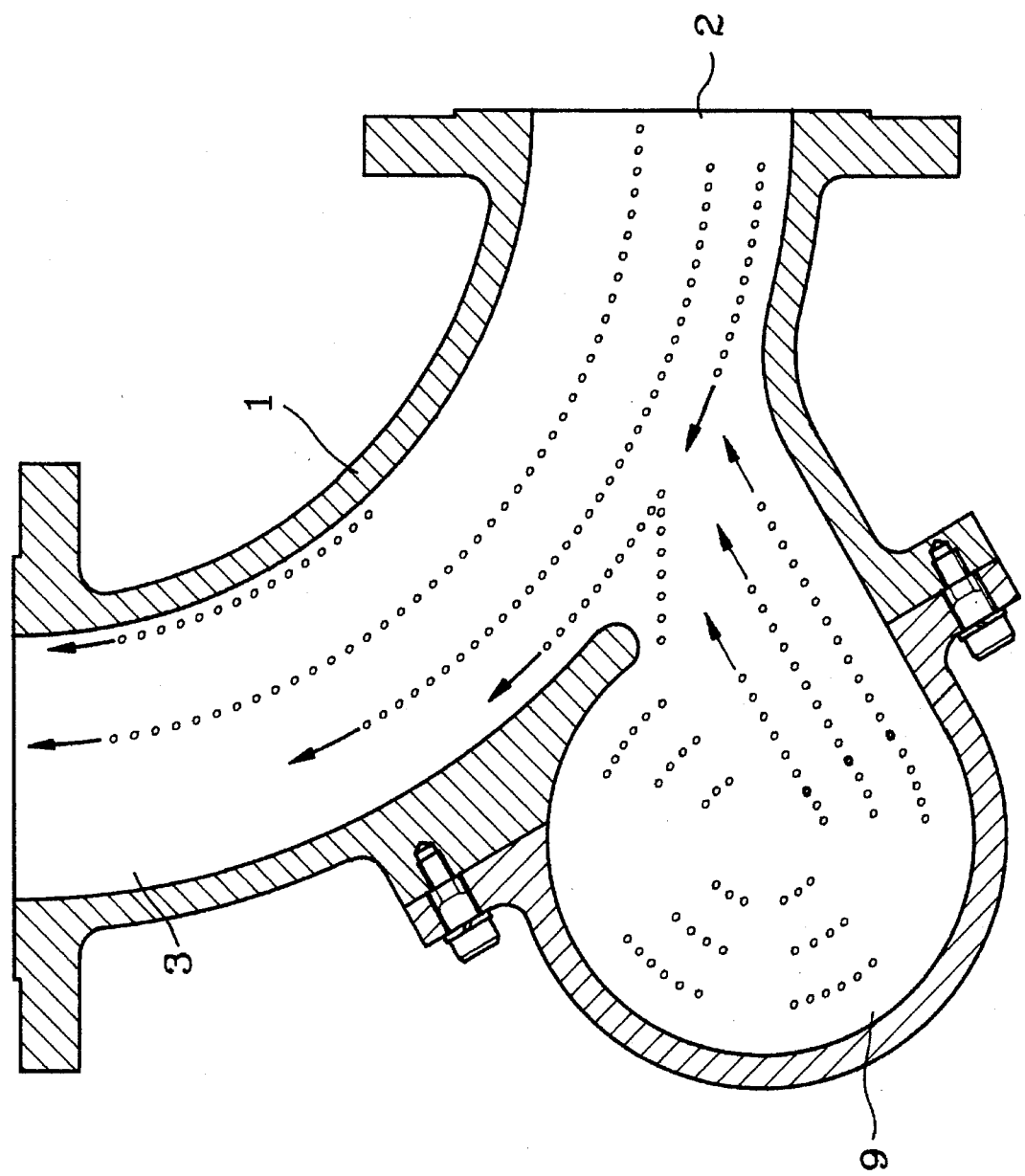
FIG. 12 is a schematic, sectional, plan view showing the elbow of the present invention in use.

When particles are transferred and routed via elbow 1 from inlet end 2 thereof, a part of them are sent into an upper portion of chamber 9. When these parts of particles move in a pressure-increased space at a reduced speed, they slowly turn and move out of chamber 9 from a bottom portion thereof and return to elbow 1. Most other subsequent particles, due to the higher pressure existing in chamber 9, change their travel direction to directly move towards outlet end 3 of elbow 1, as shown in FIG. 12. That is, most parts of subsequent particles transferred via elbow 1 can smoothly change their moving direction or angle without direct impact upon the inner wall of elbow 1. As to other small parts of transferred particles entering into chamber 9, they can exert only very little force on the inner wall of chamber 9 due to the higher relative pressure in chamber 9. As a result, chamber 9 may have longer usable life. When chamber 9 is worn out or damaged due to frequent use, it can be detached from elbow 1 simply by loosening screws 8 and replacing it with a new one, giving the whole elbow 1 a new life.

What is claimed is:

1. A renewable wear-proof elbow to be connected to a pipe and become a part thereof, said pipe being designed for transporting particles of powdered material by means of compressed air, and said renewable wear-proof elbow comprising a main elbow portion and a buffer chamber, said main elbow portion comprising:

an inlet at one end of said main elbow portion having a first flange for connection with a first section of said pipe, said inlet having a central axis;

an outlet at another end of said main elbow portion having a second flange for connection with a second section of said pipe; and a first side opening formed on a side wall of said main elbow portion opposite said inlet;

a third flange formed around said first side opening; wherein said buffer chamber having a second side opening, a central axis and a fourth flange;

said fourth flange being formed around said second opening and engaged with said third flange and means for affixing said third and fourth flanges in said engagement so as to allow said buffer chamber to be removably affixed to said main elbow portion at said first side opening thereof; and said main elbow portion further comprising a bent pipe wall section which includes said third flange surrounding said first side opening thereof so as to allow said buffer chamber to be affixed to said main elbow portion in a manner such that the central axis of said buffer chamber is offset with respect to the central axis of said inlet.

2. A renewable wear-proof elbow as claimed in claim 1, wherein said buffer chamber has an inner cross-section which is formed in a substantially truncated semi-conical shape with its largest diameter at the center thereof.

3. A renewable wear-proof elbow as claimed in claim 1, wherein said third flange contains a protrusive tongue extending away from said outlet, and said tongue has a round tip.

4. A renewable wear-proof elbow as claimed in claim 3, wherein said tongue extends between ¼ and ⅜ of the diameter of said inlet.

5. A renewable wear-proof elbow as claimed in claim 1, wherein said means for affixing said third flange and said fourth flange in said engagement includes screws.

\* \* \* \* \*